US010671718B2

(12) United States Patent
Park et al.

(10) Patent No.: US 10,671,718 B2
(45) Date of Patent: Jun. 2, 2020

(54) SYSTEM AND METHOD FOR AUTHENTICATION

(71) Applicant: SAMSUNG SDS CO., LTD., Seoul (KR)

(72) Inventors: Hyun-Chul Park, Seoul (KR); Jae-Hyuk Cho, Seoul (KR); Hee-Sung Yang, Seoul (KR); Hyun-Bea Shin, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 200 days.

(21) Appl. No.: 15/989,434

(22) Filed: May 25, 2018

(65) Prior Publication Data
US 2018/0341763 A1   Nov. 29, 2018

(30) Foreign Application Priority Data

May 26, 2017 (KR) .................. 10-2017-0065578

(51) Int. Cl.
| | |
|---|---|
| G06F 21/36 | (2013.01) |
| H04L 29/06 | (2006.01) |
| G06F 21/35 | (2013.01) |
| G06F 21/42 | (2013.01) |
| G06F 21/30 | (2013.01) |
| G06F 21/31 | (2013.01) |
| G06F 21/32 | (2013.01) |

(52) U.S. Cl.
CPC .............. *G06F 21/36* (2013.01); *G06F 21/35* (2013.01); *G06F 21/42* (2013.01); *H04L 63/0853* (2013.01); *H04L 63/0861* (2013.01); *H04L 63/18* (2013.01); *G06F 21/30* (2013.01); *G06F 21/31* (2013.01); *G06F 21/32* (2013.01); *H04L 2463/082* (2013.01)

(58) Field of Classification Search
CPC ..... H04L 63/32; H04L 63/3234; H04L 63/08; H04L 63/083; H04L 63/14; G06F 21/36; G06F 21/30–46
See application file for complete search history.

(56) References Cited

U.S. PATENT DOCUMENTS

| | | | |
|---|---|---|---|
| 2007/0074040 A1* | 3/2007 | Lakshmeshwar | H04L 9/3231 713/186 |
| 2017/0208465 A1* | 7/2017 | Terao | H04L 9/0841 |
| 2017/0262845 A1* | 9/2017 | Eisen | G06Q 20/3274 |

* cited by examiner

*Primary Examiner* — Kristine L Kincaid
*Assistant Examiner* — Shaqueal D Wade
(74) *Attorney, Agent, or Firm* — Sughrue Mion, PLLC

(57) ABSTRACT

A system and method for authentication are provided. The system for authentication according to one embodiment of the present disclosure includes: a service server configured to: receive a first authentication request message from an authentication server and convert a random number included in the first authentication request message into an optical code; a first user terminal configured to receive the optical code from the service server and display the optical code; and a second user terminal configured to: recognize the random number by capturing an image of the displayed optical code in response to receiving a second authentication request message from the service server and authenticate a user by using the random number, the second authentication request message, and biometric information of the user.

16 Claims, 5 Drawing Sheets

SYSTEM AND METHOD FOR AUTHENTICATION

CROSS-REFERENCE TO RELATED APPLICATION(S)

This application claims the benefit under 35 USC § 119(a) of Korean Patent Application No. 10-2017-0065578, filed on May 26, 2017, in the Korean Intellectual Property Office, the entire disclosure of which is incorporated herein by reference for all purposes.

BACKGROUND

1. Field

The following description relates to a fast identity online authentication technology.

2. Description of Related Art

Fast identity online (FIDO) authentication is a technique of authenticating a user using the user's biometric information, such as fingerprint, iris, face information, and the like. The FIDO authentication is advantageous in that it is safer and easier than existing authentication methods that use a user's ID and password.

Generally, in the case of the FIDO authentication technique, a signature value is generated by digitally signing an authentication message and a random number transmitted from a FIDO server using a FIDO private key wherein the authentication message is generated when a user's biometric information is authenticated at a user terminal. The signature value is verified with a FIDO public key and the result is transmitted to a service server.

According to the conventional FIDO authentication technique, however, there is a risk that the random number is leaked due to malicious code, malicious software, or the like in the process of transmitting the random number from the FIDO server to the user terminal. In this case, there are difficulties in providing services (e.g., inquiring of bank transaction details, credit card payment, and the like) requiring high level of security and a great deal of damage may be caused to users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure are directed to improving security of digital signature in the process of fast identity online (FIDO) authentication.

In one general aspect, there is provided a system for authentication including: a service server configured to: receive a first authentication request message from an authentication server and convert a random number included in the first authentication request message into an optical code; a first user terminal configured to receive the optical code from the service server and display the optical code; and a second user terminal configured to: recognize the random number by capturing an image of the displayed optical code in response to receiving a second authentication request message from the service server and authenticate a user by using the random number, the second authentication request message, and biometric information of the user.

The service server may be further configured to generate the second authentication request message by excluding the random number from the first authentication request message.

The second user terminal may be further configured to acquire the first authentication request message by adding the recognized random number to the second authentication request message.

The optical code may comprise at least one from among a QR code and a barcode.

The second user terminal may be a mobile device.

In another general aspect, there is provided a method of authentication including: receiving, at a service server, a first authentication request message from an authentication server; converting, at the service server, a random number included in the first authentication request message into an optical code; receiving, at a first user terminal, the optical code from the service server; displaying, at the first user terminal, the optical code; recognizing, at a second user terminal, the random number by capturing an image of the displayed optical code in response to receiving a second authentication request message from the service server; and authenticating, at the second user terminal, a user by using the random number, the second authentication request message, and biometric information of the user.

The method may further include, after the receiving of the first authentication request message, generating, at the service server, the second authentication request message by excluding the random number from the first authentication request message.

The method may further include, before the authenticating of the user, acquiring, at the second user terminal, the first authentication request message by adding the recognized random number to the second authentication request message.

The optical code may comprise at least one from among a QR code and a barcode.

The second user terminal may be a mobile device.

In still another general aspect, there is provided a service server including: a data receiver configured to receive a first authentication request message from an authentication server in response to an authentication request from a user; a data processor configured to: convert a random number included in the first authentication request message into an optical code; and generate a second authentication request message by excluding the random number from the first authentication request message; and a data transmitter configured to transmit the optical code to a first user terminal and transmit the second authentication request message to a second user terminal.

The optical code may comprise at least one from among a QR code and a barcode.

The second user terminal may be a mobile device.

In yet general aspect, there is provided a method of authentication including: receiving, at a data receiver, a first authentication request message from an authentication server in response to an authentication request from a user; converting, at a data processor, a random number included in the first authentication request message into an optical code; generating, at the data processor, a second authentication request message by excluding the random number from the first authentication request message; and transmitting, by a data transmitter, the optical code to a first user terminal, and transmitting, by the data transmitter, the second authentication request message to a second user terminal.

The optical code may comprise at least one from among a QR code and a barcode.

The second user terminal may be a mobile device.

Other features and aspects will be apparent from the following detailed description, the drawings, and the claims.

Figure 1:
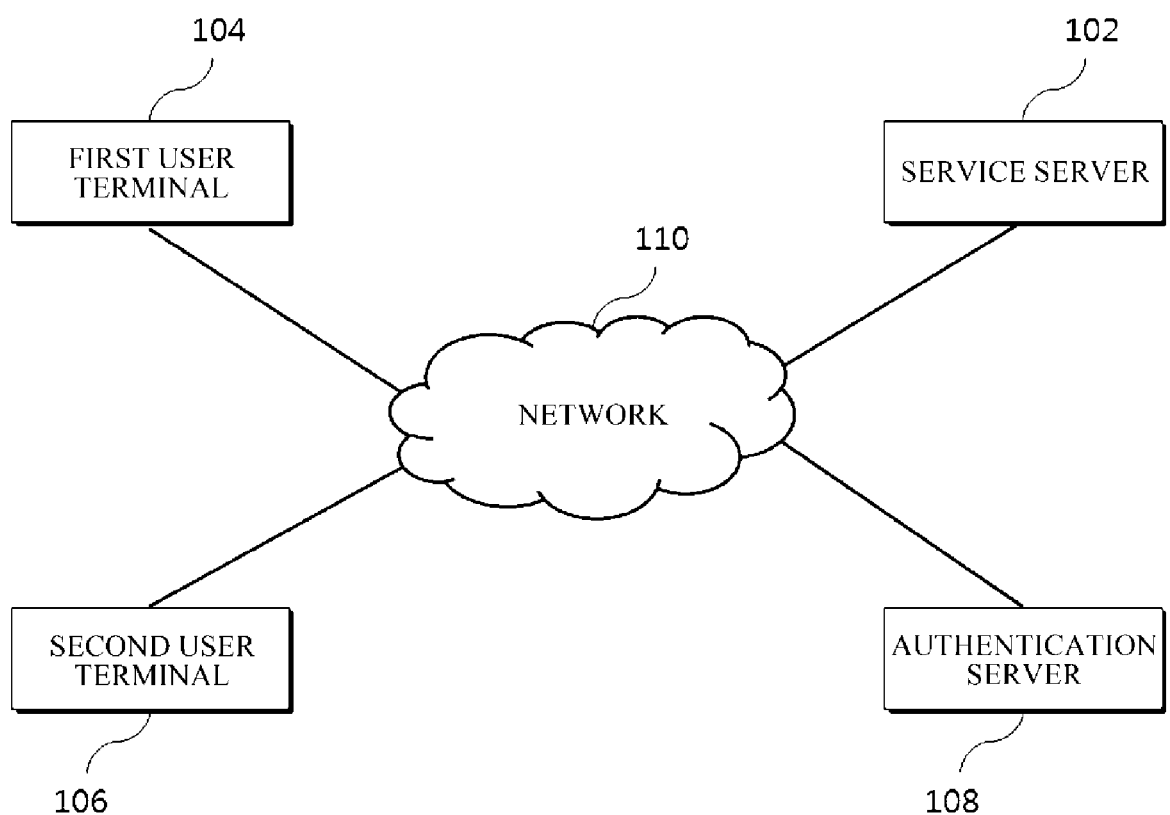
FIG. 1 is a block diagram illustrating a detailed configuration of an authentication system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating a detailed configuration of an authentication system 100 according to one embodiment of the present disclosure. As shown in FIG. 1, the authentication system 100 according to one embodiment of the present disclosure includes a service server 102, a first user terminal 104, a second user terminal 106, and an authentication server 108, and these components may be connected to one another through a network 110. In this case, the network 110 is used in a broad sense, including a packet communication network, such as 3$^{rd}$ generation (3G) network, 4G network, a long-term evolution (LTE) network, or WiBro network, and a wired/wireless Internet network.

The service server 102 may be a device for providing various services, such as securities transaction service, bank transaction service, and the like, to a user, and may be, for example, a securities company server, a bank server, a credit card company server, an insurance company server, and the like. The service server 102 may provide a service module (not shown) to the first user terminal 104 and the second user terminal 106, and the user may be provided with various services from the service server 102 through the service modules installed in the first user terminal 104 and the second user terminal 106. The service module may be, for example, a securities company application, a bank application, and the like.

In this case, the service server 102, the first user 104, the second user terminal 106, and the authentication server 108 may perform authentication process for the user to provide the services. In the embodiments described herein, the authentication process may be fast identity online (FIDO) authentication process. FIDO authentication refers to a technique of authenticating a user using biometric information of the user, such as fingerprint, iris, face information, and the like.

To this end, the first user terminal 104 may receive an authentication request (a request for login to the service server 102 or the service module provided by the service server 102) from the user and transmit the authentication request to the service server 102. The service server 102 may receive the user's authentication request from the first user terminal 104 and transmit the user's authentication request to the authentication server 108. The authentication request of the user may include user information, such as a name, ID, and password of the user, and a variety of transaction data related to the service to be provided.

Then, the service server 102 may receive a first authentication request message from the authentication server 108. The first authentication request message may include a one-time random number, an authentication policy, the transaction data, and the like. The random number may be composed of one or more figures, characters, or a combination thereof, and may be created by the authentication server 108.

The service server 102 may convert a random number included in the first authentication request message into an optical code in response to receiving the first authentication request message from the authentication server 108, and transmit the optical code to the first user terminal 104. In this case, the optical code is a code capable of storing information within a predetermined size (e.g., up to about 7,000 figures, up to about 4,200 characters, up to about 2,900 bytes in binary, etc.) and may be a QR code, a barcode, or the like.

In addition, the service server 102 may generate a second authentication request message and transmit the second authentication request message to the second user terminal 106. In this case, the service server 102 may generate the second authentication request message by excluding the random number from the first authentication request message. The second authentication request message may include, for example, an authentication policy, transaction data, and the like.

As such, the service server 102 may transmit the optical code corresponding to the random number and the second authentication request message from which the random number is excluded to the first user terminal 104 and the second user terminal 106, respectively. That is, the service server 102 divides pieces of data necessary for authentication process and transmits the pieces of divided data separately to the first user terminal 104 and the second user terminal 106, rather than transmitting the data intact to the first user terminal 104 and the second user terminal 106, so that the security of the authentication process can be improved.

The first user terminal 104 is a device used for receiving various services (e.g., securities transaction service, such as purchase and sale of securities, and bank transaction service, such as bank transfer, balance inquiry, and bank transaction inquiry, and the like). In the embodiments described herein, the first user terminal 104 may be, for example, a non-mobile device, such as a desktop computer. However, aspects of the present disclosure are not limited thereto such that the first user terminal 104 may be, for example, a mobile device, such as a notebook computer, a tablet personal computer (PC), a personal digital assistant (PDA), and the like.

The first user terminal 104 may receive the authentication request input by the user, transmit the authentication request to the service server 102, and receive an optical code from the service server 102. Then, the first user terminal 104 may display the optical code through a display module (not shown).

The second user terminal 106 is a device to perform the authentication process for the user and may be, for example, a smartphone, a tablet PC, a PDA, or a wearable device, such as a smart watch. In the embodiments described herein, the second user terminal 106 may be a portable mobile device that the user can carry around.

The second user terminal 106 may receive the second authentication request message from the service server 102 and request the user to capture an image of the optical code displayed on the first user terminal 104 in response to receiving the second authentication request message. The second user terminal 106 may recognize the random number by capturing the image of the optical code displayed on the first user terminal 104 through an optical module mounted in or connected to the first user terminal 104 in response to the user's input. In this case, the optical module is a device used to capture an image of the optical code and may be, for example, a camera, a QR code reader, a barcode reader, or the like.

In addition, the second user terminal 106 may recognize the user by recognizing the random number. Specifically, the second user terminal 106 may add the recognized random number to the second authentication request message received from the service server 102, thereby acquiring the first authentication request message, and may recognize the user using the first authentication request message and biometric information of the user.

In one example, the second user terminal 106 may acquire the biometric information of the user through an authenticator (not shown), such as a fingerprint sensor, a face sensor, or the like, and add the random number and transaction data included in the first authentication request message to an authentication message indicating the authentication result. Then, the second user terminal 106 may digitally signs the resulting authentication message using a private key, thereby generating a signature value. In this case, the second user terminal 106 may acquire a first hash value by hashing the authentication message including the random number and transaction data and generate the signature value by encrypting the first hash value using the private key. The private key may be, for example, FIDO private key and may be created by the second user terminal 106. In addition, the second user terminal 106 may determine a type of authenticator to be used for user authentication before authenticating the user by referring to the authentication policy included in the first authentication request message.

Thereafter, the second user terminal 106 may transmit the authentication message and the signature value to the first user terminal 104. The first user terminal 104 may transmit the authentication message and the signature value to the service server 102 as a response to the user's authentication request, and the service server 102 may transmit the authentication message and the signature value to the authentication server 108.

The authentication server 108 is a device used for authenticating a user and may be, for example, a FIDO server. The authentication server 108 may create a one-time random number in response to the user's authentication request and transmit the first authentication request message including the random number to the service server 102. As described above, the first authentication request message may include, for example, the one-time random number, the authentication policy, the transaction data, and the like.

In addition, the authentication server 108 may receive the authentication message and the signature value from the service server 102 and verify the signature value.

In one example, the authentication server 108 may verify the signature value using a previously issued public key (i.e., a public key corresponding to the private key). The public key may be, for example, a FIDO public key and may be created by the second user terminal 106 and distributed to the authentication server 108.

Then, the authentication server 108 may transmit an authentication result to the service server 102 and the service server 102 may transmit the authentication result to the first user terminal 104.

As such, according to the embodiments of the present disclosure, the service server 102 transmits an optical code corresponding to a random number and the second authentication request message from which the random number is excluded to the first user terminal 104 and the second user terminal 106, respectively, and the second user terminal 106 recognizes the random number by capturing an image of the optical code and acquires the first authentication request message, so that the risk of leakage of the random number during the transmission of the random number can be fundamentally prevented.

In addition, according to the embodiments of the present disclosure, the optical code displayed on the first user terminal 104 is photographed through an optical module included in the second user terminal 106 so that the random number required for the authentication process can be easily recognized. In this case, the user may easily ensure proximity to the first user terminal 104 using the second user terminal 106 owned by the user and a short range wireless communication module, such as a Bluetooth module, does not need to be installed in the first user terminal 104 in order to ensure the proximity to the first user terminal 104 and the second user terminal 106.

That is, according to the embodiments of the present disclosure, when an authentication process is performed using heterogeneous devices (e.g., a non-mobile device, such as a desktop PC, and a mobile device, such as a smartphone), the authentication process can be easily performed using an existing function and module without having to installing an additional device.

Figure 2:
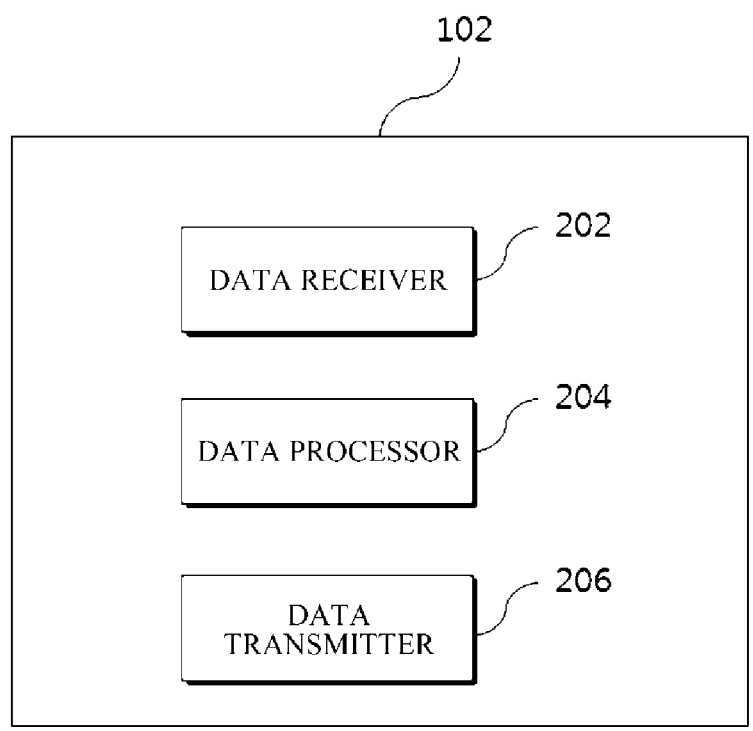
FIG. 2 is a block diagram illustrating a detailed configuration of a service server according to one embodiment of the present disclosure.

FIG. 2 is a block diagram illustrating a detailed configuration of a service server 102 according to one embodiment of the present disclosure. As shown in FIG. 2, the service server 102 according to one embodiment of the present disclosure includes a data receiver 202, a data processor 204, and a data transmitter 206.

The data receiver 202 receives a first authentication request message from an authentication server 108. The data receiver 202 may receive a user's authentication request from a first user terminal 104 and the data transmitter 206, which will be described below, may transmit the user's authentication request to the authentication server 108. The data receiver 202 may receive the first authentication request message from the authentication server 108 as a response to the user's authentication request.

The data processor 204 divides the first authentication request message received from the authentication server 108. Specifically, the data processor 204 may convert a random number included in the first authentication request message into an optical code and generate a second authentication request message by excluding the random number from the first authentication request message. That is, the data processor 204 may divide the first authentication request message into the optical code corresponding to the random number and the second authentication request message in which the random number is not included.

The data transmitter 206 transmits the optical code and the second authentication request message to the first user terminal 104 and the second user terminal 106, respectively. Accordingly, the first user terminal 104 displays the optical code and the second user terminal 106 captures an image of the optical code displayed on the first user terminal 104 to recognize the random number. In addition, as described above, the data transmitter 206 may transmit the user's authentication request to the authentication server 108 in response to receiving the user's authentication request from the first user terminal 104.

Figure 3:
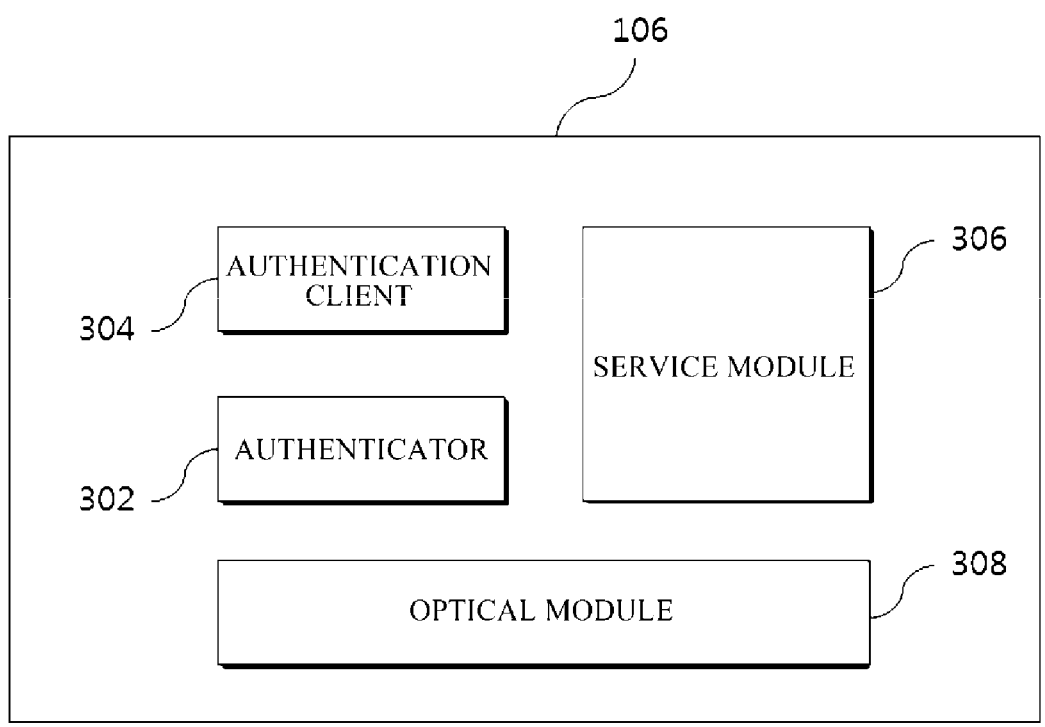
FIG. 3 is a block diagram illustrating a detailed configuration of a second user terminal according to one embodiment of the present disclosure.

FIG. 3 is a block diagram illustrating a detailed configuration of a second user terminal 106 according to one embodiment of the present disclosure. As shown in FIG. 3, the second user terminal 106 according to one embodiment of the present disclosure includes an authenticator 302, an authentication client 304, a service module 306, and an optical module 308.

The authenticator 302 is a device used for authenticating biometric information of a user and may be, for example, a fingerprint sensor, a face recognizer, a iris recognition device, a voice recognition device, or the like. The authenticator 302 may be embedded in or attached to the second user terminal 106, but is not limited thereto, and may be configured as a device separate from the second user terminal 106. In addition, the authenticator 302 may issue a pair of a private key (e.g., FIDO private key) and a public key (e.g., FIDO public key). The private key may be stored, for example, in an internal database (not shown) of the authenticator 302 and a first public key may be distributed to an authentication server 108.

In addition, the authenticator 302 may authenticate the biometric information of the user and generate a signature value by adding a random number and transaction data to an authentication message indicating the authentication result and digitally signing the resulting authentication message with the stored private key. Thereafter, the authenticator 302 may transmit the authentication message and the signature value to the authentication client 304 through an authenticator specific module (ASM) (not shown).

The authentication client 304 is a module for requesting the authenticator 302 to authenticate the user and may be, for example, a FIDO client. In this case, the authentication client 304 may determine a type of authenticator to be used to authenticate the user by referring to an authentication policy included in the first authentication request message.

The authentication client 304 may request the authenticator 302 to authenticate the user and forward the authentication message and signature value received from the authenticator 302 to the service module 308.

The service module 306 is application software provided by the service server 102 and may be, for example, a securities company application, a bank application, or the like. The service module 306 may receive a second authentication request message from the service server 102 and request the user to capture an image of an optical code displayed on the first user terminal 104.

In addition, the service module 306 may capture an image of the optical code displayed on the first user terminal 104 in association with the optical module 308 in response to a user's input and convert the captured optical code into a random number. The service module 306 may add the random number to the second authentication request message received from the service server 102 to acquire the first authentication request message and may transmit the first authentication request message to the authentication client 304. The authentication client 304 may request the authenticator 302 to authenticate the user in response to receiving the first authentication request message from the service module 306.

Further, the service module 306 may receive the authentication message and the signature value from the authentication client 304 and transmit them to the first user terminal 104.

The optical module 308 is a device used for capturing an image of the optical code displayed on the first user terminal 104 and may be, for example, a camera, a QR code reader, a barcode reader, or the like. The optical module 308 may operate in association with the service module 308 and the service module 308 may capture an image of the optical code displayed on the first user terminal 104 through the optical module 308 in response to a user's input.

Figure 4:
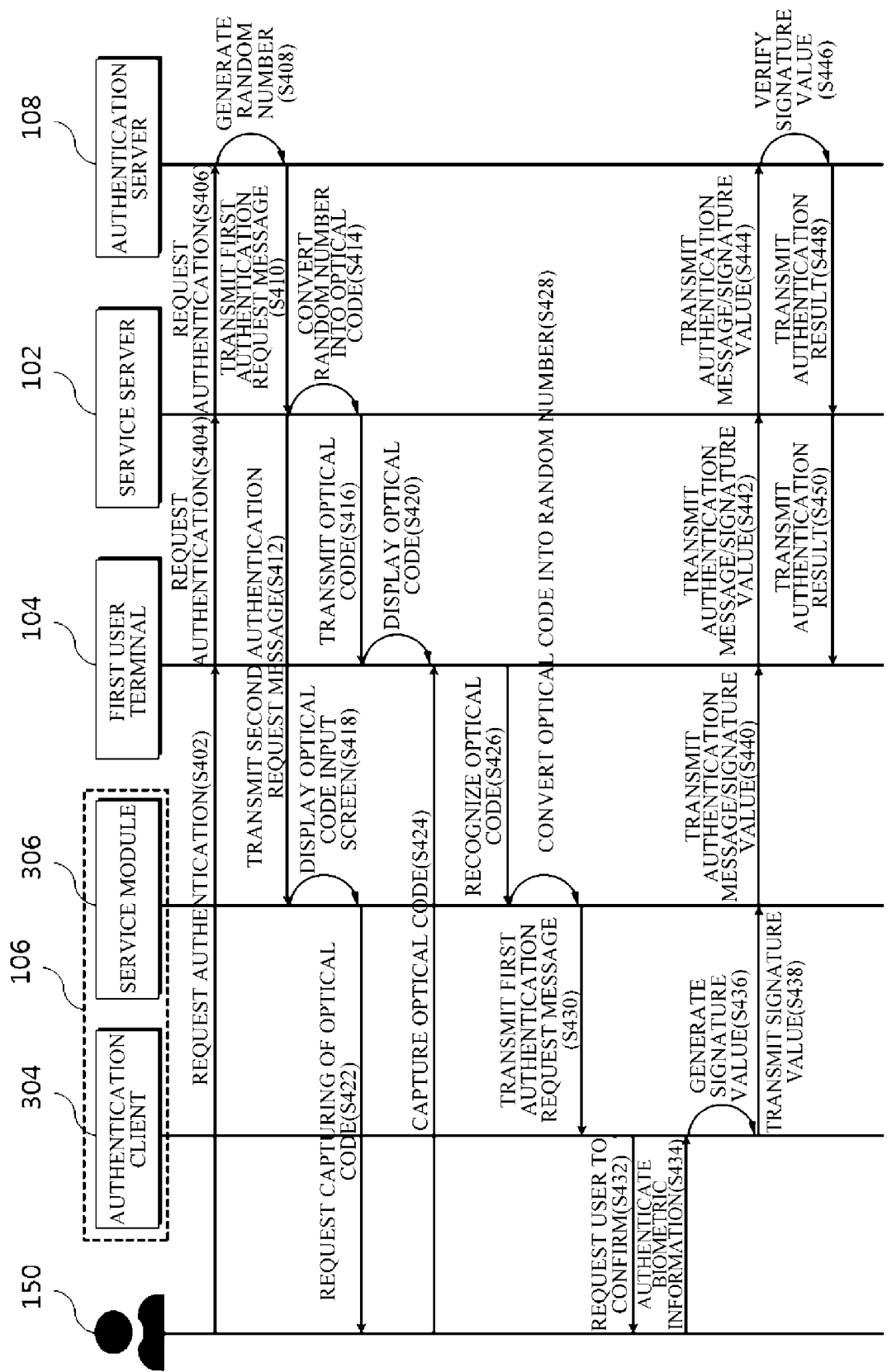
FIG. 4 is a flowchart for describing an authentication method according to one embodiment of the present disclosure.

FIG. 4 is a flowchart for describing an authentication method according to one embodiment of the present disclosure. In the illustrated flowchart described herein, one process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

First, a first user terminal 104 receives an authentication request input from a user 150 in operation S402.

Then, the first user terminal 104 transmits the authentication request to a service server 102 in operation S404.

The service server 102 transmits the authentication request to an authentication server 108 in operation S406.

Then, the authentication server 108 generates a one-time random number in operation S408.

The authentication server 108 transmits a first authentication request message to the service server 102 in operation S410. As described above, the first authentication request message may include the one-time random number, an authentication policy, the transaction data, and the like.

Then, the service server 102 transmits a second authentication request message to the first user 104 in operation S412. As described above, the service server 102 may generate the second authentication request message by excluding the random number from the first authentication request message. The second authentication request message may include, for example, the authentication policy, the transaction data, and the like.

In addition, the service server 102 converts the random number included in the first authentication request message into an optical code in operation S414. Meanwhile, FIG. 4 operation S414 is illustrated as being performed after operation S412 for convenience of description, but operation S414 may be performed prior to or concurrently with operation S412. Operations S418, S416, and S420 do not need to be performed in the order as illustrated and the order for performing the operations may be changed.

Then, the service server 102 transmits the optical code to the first user terminal 104 in operation S416.

In addition, a service module 308 of the second user terminal 106 displays a screen for inputting the optical code in response to receiving the second authentication request message from the service server 102 in operation S418.

Then, the first user terminal 104 displays the optical code on a screen in operation S420.

Then, the service module 308 request the user 150 to capture an image of the optical code displayed on the first user terminal 104 in operation S422. For example, the service module 308 may display a message to request capturing of the optical code on the screen.

Then, the service module 308 captures an image of the optical code displayed on the first user terminal 104 in association with the optical module 308 in response to an input of the user 150 and recognizes the captured optical code in operations S424 and S426.

Then, the service module 208 converts the optical code into a random number in operation S428. In this case, the service module 398 of the second user terminal 106 may acquire the first authentication request message by adding the random number to the second authentication request message received from the service server 102.

Then, the service module 308 transmits the first authentication request message to an authentication client 304 in operation S430.

The authentication client 304 requests the user 150 to confirm biometric information in response to receiving the first authentication request message from the service module 308 in operation S432. In one example, the authentication client 304 may output a guidance message for fingerprint input.

Then, the authentication client 304 authenticates the biometric information of the user 150 in association with an authenticator 302, in operation S434. In one example, the authentication client 304 may receive fingerprint information from the user 150 through the authenticator 302 and authenticate the fingerprint information.

Then, the authentication client 304 generates a signature value by adding the random number and transaction data included in the first authentication request message to an authentication message indicating the authentication result and digitally signing the resulting authentication message with a previously stored private key, in operation S436.

Then, the authentication client 304 transmits the authentication message and the signature value to the service module 308 in operation S438.

Then, the service module 308 transmits the authentication message and the signature value to the first user terminal 104 in operation S440.

Then, the first user terminal 104 transmits the authentication message and the signature value to the service server 102 as a response to the authentication request of the user 150 in operation S442, and the service server 102 transmits the authentication message and the signature value to the authentication server 108 in operation S444.

Then, the authentication server 108 verifies the signature value using a previously issued public key in operation S446. In one example, the authentication server 108 may obtain the above-described first hash value by decrypting the signature value using the public key and obtain a second hash value by hashing the authentication message (i.e., original signature). The authentication server 108 may compare the first hash value with the second hash value, and when the first hash value is identical to the second hash value, it may be determined that the verification of the signature value is completed.

When the verification of the signature value is completed, the authentication server 108 transmits an authentication result including an authentication completion message to the service server 102 in operation S448. When the verification of the signature value is failed, the authentication server 108 may transmit an authentication result including an authentication failure message to the service server 102.

Thereafter, the authentication server 108 transmits the authentication result to the first user terminal 104 in operation S450.

Figure 5:
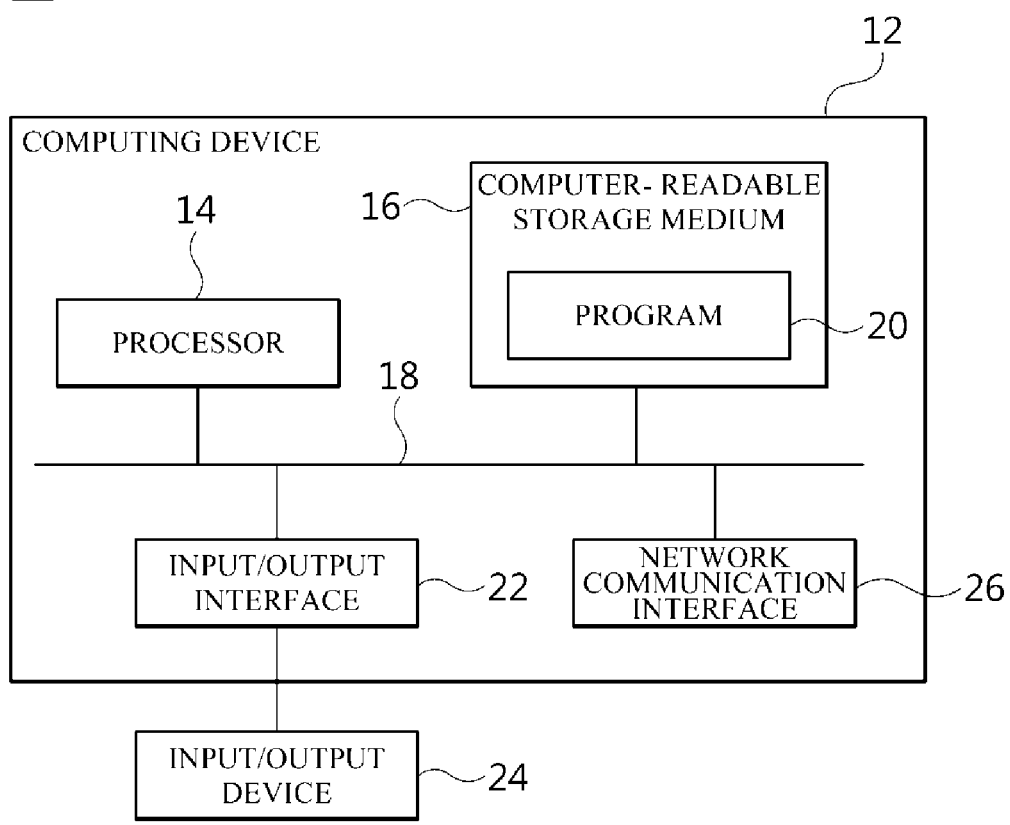
FIG. 5 is a block diagram for describing a computing environment including a computing device suitable to be used in exemplary embodiments.

FIG. 5 is a block diagram for describing a computing environment including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an authentication system 100 or one or more components included in the authentication system 100.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, the service server divides pieces of data necessary for authentication process and transmits the pieces of divided data separately to the first user terminal and the second user terminal, rather than transmitting the data intact to the first user terminal and the second user terminal, so that the security of the authentication process can be improved.

In addition, the optical code displayed on the first user terminal is photographed through an optical module included in the second user terminal so that the random number required for the authentication process can be easily recognized, and consequently, the proximity to the first user terminal and the second user terminal can be easily ensured without adding a short range wireless communication module, such as a Bluetooth module or the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for authentication comprising:
a service server configured to:
receive a first authentication request message from an authentication server; and
convert a random number included in the first authentication request message into an optical code;
a first user terminal configured to receive the optical code from the service server and display the optical code; and
a second user terminal configured to:
recognize the random number by capturing an image of the displayed optical code in response to receiving a second authentication request message from the service server; and
authenticate a user by using the random number, the second authentication request message, and biometric information of the user.

2. The system of claim 1, wherein the service server is further configured to generate the second authentication request message by excluding the random number from the first authentication request message.

3. The system of claim 2, wherein the second user terminal is further configured to acquire the first authentication request message by adding the recognized random number to the second authentication request message.

4. The system of claim 1, wherein the optical code comprises at least one from among a QR code and a barcode.

5. The system of claim 1, wherein the second user terminal is a mobile device.

6. A method of authentication comprising:
receiving, at a service server, a first authentication request message from an authentication server;
converting, at the service server, a random number included in the first authentication request message into an optical code;
receiving, at a first user terminal, the optical code from the service server;
displaying, at the first user terminal, the optical code;
recognizing, at a second user terminal, the random number by capturing an image of the displayed optical code in response to receiving a second authentication request message from the service server; and
authenticating, at the second user terminal, a user by using the random number, the second authentication request message, and biometric information of the user.

7. The method of claim 6, further comprising, after the receiving of the first authentication request message, generating, at the service server, the second authentication request message by excluding the random number from the first authentication request message.

8. The method of claim 7, further comprising, before the authenticating of the user, acquiring, at the second user terminal, the first authentication request message by adding the recognized random number to the second authentication request message.

9. The method of claim 6, wherein the optical code comprises at least one from among a QR code and a barcode.

10. The method of claim 6, wherein the second user terminal is a mobile device.

11. A service server comprising:
a data receiver configured to receive a first authentication request message from an authentication server;
a data processor configured to:
convert a random number included in the first authentication request message into an optical code; and
generate a second authentication request message by excluding the random number from the first authentication request message; and
a data transmitter configured to transmit the optical code to a first user terminal and transmit the second authentication request message to a second user terminal.

12. The service server of claim 11, wherein the optical code comprises at least one from among a QR code and a barcode.

13. The service server of claim 11, wherein the second user terminal is a mobile device.

14. A method of authentication comprising:
receiving, at a data receiver, a first authentication request message from an authentication server;
converting, at a data processor, a random number included in the first authentication request message into an optical code;
generating, at the data processor, a second authentication request message by excluding the random number from the first authentication request message; and
transmitting, by a data transmitter, the optical code to a first user terminal, and transmitting, by the data transmitter, the second authentication request message to a second user terminal.

15. The method of claim 14, wherein the optical code comprises at least one from among a QR code and a barcode.

16. The method of claim 14, wherein the second user terminal is a mobile device.

\* \* \* \* \*